(12) United States Patent
Tamura et al.

(10) Patent No.: US 7,122,279 B2
(45) Date of Patent: Oct. 17, 2006

(54) ELECTRODE FOR RECHARGEABLE LITHIUM BATTERY AND RECHARGEABLE LITHIUM BATTERY

(75) Inventors: Noriyuki Tamura, Kobe (JP); Shiori Nakamizo, Amagasaki (JP); Daizo Jito, Kobe (JP); Ryuji Ohshita, Tokushima (JP); Masahisa Fujimoto, Osaka (JP); Shin Fujitani, Kobe (JP); Maruo Kamino, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 326 days.

(21) Appl. No.: 10/258,436

(22) PCT Filed: Apr. 24, 2001

(86) PCT No.: PCT/JP01/03538

§ 371 (c)(1),
(2), (4) Date: Oct. 24, 2002

(87) PCT Pub. No.: WO01/84654

PCT Pub. Date: Nov. 8, 2001

(65) Prior Publication Data

US 2003/0108795 A1  Jun. 12, 2003

(30) Foreign Application Priority Data

Apr. 26, 2000 (JP) ............... 2000-125606
Sep. 19, 2000 (JP) ............... 2000-284020
Nov. 14, 2000 (JP) ............... 2000-346985

(51) Int. Cl.
*H01M 4/58* (2006.01)
(52) U.S. Cl. .............................. 429/231.95
(58) Field of Classification Search .......... 429/231.95, 429/245
See application file for complete search history.

(56) References Cited

U.S. PATENT DOCUMENTS

| | | | |
|---|---|---|---|
| 4,997,732 A | 3/1991 | Austin et al. | 429/153 |
| 5,108,852 A | 4/1992 | Tomantschger et al. | 429/66 |
| 5,494,762 A | 2/1996 | Isoyama et al. | 429/194 |
| 5,631,100 A | 5/1997 | Yoshino et al. | 429/62 |
| 5,641,591 A | 6/1997 | Kawakami et al. | 429/218 |
| 5,888,670 A | 3/1999 | Kawakami | 429/231.4 |
| 6,048,646 A | 4/2000 | Xing et al. | 429/233 |
| 6,402,795 B1 | 6/2002 | Chu et al. | 29/623.5 |
| 6,432,585 B1 * | 8/2002 | Kawakami et al. | 429/233 |
| 6,743,369 B1 | 6/2004 | Jito et al. | 216/13 |
| 6,746,802 B1 | 6/2004 | Tamura et al. | 429/245 |
| 2002/0192564 A1 | 12/2002 | Ota et al. | 429/324 |
| 2004/0224231 A1 | 11/2004 | Fujimoto et al. | 429/232 |

FOREIGN PATENT DOCUMENTS

| | | |
|---|---|---|
| CN | 1092208 A | 9/1994 |
| EP | 0 854 529 A1 | 7/1998 |
| EP | 0 855 752 A2 | 7/1998 |
| EP | 0 910 131 A1 | 4/1999 |
| EP | 0 948 074 A2 | 10/1999 |
| HU | P9202646 A | 9/1995 |
| JP | 60-175375 A | 9/1985 |
| JP | 62-243247 A | 10/1987 |
| JP | 63-314762 A | 12/1988 |
| JP | 05-074479 A | 3/1993 |
| JP | 5-101830 A | 4/1993 |
| JP | 5-226004 A | 9/1993 |
| JP | 6-140045 A | 5/1994 |
| JP | 6-168737 A | 6/1994 |
| JP | 06-187994 A | 7/1994 |
| JP | 07-282800 A | 10/1995 |
| JP | 7-302588 A | 11/1995 |
| JP | 08-037000 A | 2/1996 |
| JP | 8-50922 A | 2/1996 |
| JP | 8-255610 A | 10/1996 |
| JP | 9-17441 A | 1/1997 |
| JP | 9-115523 A | 5/1997 |
| JP | 9-147856 A | 6/1997 |
| JP | 9-213339 A | 8/1997 |
| JP | 10-21928 A | 1/1998 |
| JP | 10-199524 A | 7/1998 |
| JP | 10-208740 A | 8/1998 |
| JP | 10-223221 A | 8/1998 |
| JP | 10-294098 A | 11/1998 |
| JP | 10-308207 A | 11/1998 |
| JP | 10-326628 A | 12/1998 |
| JP | 11-73946 | 3/1999 |
| JP | 11-86854 A | 3/1999 |
| JP | 11-86875 A | 3/1999 |
| JP | 11-135115 A | 5/1999 |
| JP | 11-135130 A | 5/1999 |

(Continued)

OTHER PUBLICATIONS

Huggins, Robert A.; "Lithium alloy negative electrodes formed from convertible oxides"; *Solid State Ionics 113-115*; pp. 57-67; 1998.

(Continued)

*Primary Examiner*—Patrick Joseph Ryan
*Assistant Examiner*—Thomas H. Parsons
(74) *Attorney, Agent, or Firm*—Kubovcik & Kubovcik

(57) ABSTRACT

A lithium secondary battery-use electrode and a lithium secondary battery, which are high in discharge capacity and excellent in cycle characteristics, characterized in that a layer consisting of a metal alloying with Li is provided on a substrate consisting of a metal not alloying with Li, and a layer having these metals mixed therein is formed between the above layer and the substrate.

37 Claims, 11 Drawing Sheets

FOREIGN PATENT DOCUMENTS

| | | |
|---|---|---|
| JP | 11-154508 | 6/1999 |
| JP | 11-167930 A | 6/1999 |
| JP | 11-185744 A | 7/1999 |
| JP | 11-233116 A | 8/1999 |
| JP | 11-242954 A | 9/1999 |
| JP | 11-250892 A | 9/1999 |
| JP | 11-273683 A | 10/1999 |
| JP | 11-283628 A | 10/1999 |
| JP | 11-339811 | 12/1999 |
| JP | 2000-11997 A | 1/2000 |
| JP | 2000-012088 A | 1/2000 |
| JP | 2000-12089 A | 1/2000 |
| JP | 2000-12091 A | 1/2000 |
| JP | 2000-149928 A | 1/2000 |
| JP | 2000-100429 A | 4/2000 |
| JP | 2000-133276 A | 5/2000 |
| JP | 2000-182623 A | 6/2000 |
| JP | 2000-208136 A | 7/2000 |
| JP | 2000-228187 A | 8/2000 |
| JP | 2000-294249 A | 10/2000 |
| JP | 2000-294250 A | 10/2000 |
| JP | 2000-294251 A | 10/2000 |
| JP | 2001-76710 A | 3/2001 |

OTHER PUBLICATIONS

U.S. Appl. No. 10/110,313, filed Apr. 11, 2002, Masahisa Fujimoto et al.

U.S. Appl. No. 10/111,070, filed Apr. 19, 2002, Masahisa Fujimoto et al.

U.S. Appl. No. 10/111,071, filed Apr. 19, 2002, Masahisa Fujimoto et al.

U.S. Appl. No. 10/111,073, filed Apr. 19, 2002, Masahisa Fujimoto et al.

U.S. Appl. No. 10/111,074, filed Aug. 1, 2002, Hiroaki Ikeda et al.

U.S. Appl. No. 10/111,075, filed Sep. 10, 2002, Hiroaki Ikeda et al.

Bourderau, S. et al.; "Amorphous Silicon as a Possible Anode Material for Li-ion Batteries"; Journal of Power Sources; vols. 81-82, pp. 233-236, 1999.

Hawley's condensed Chemical Dictionary, 11$^{th}$ edition, pp. 1033 & 1039, 1987.

* cited by examiner

←―― 3 μm ――→

ELECTRODE FOR RECHARGEABLE LITHIUM BATTERY AND RECHARGEABLE LITHIUM BATTERY

TECHNICAL FIELD

The present invention relates to a novel electrode for a rechargeable lithium battery and a rechargeable lithium battery utilizing the same.

BACKGROUND ART

Rechargeable lithium batteries, recently under extensive development and research, exhibit battery characteristics, such as charge-discharge voltage, charge-discharge cycle life characteristics and storage characteristics, which depend largely upon the types of the electrodes used. This has led to the various attempts to better battery characteristics by improving active electrode materials.

The use of metallic lithium as the negative active material enables construction of batteries which exhibit high energy densities, both gravimetric and volumetric. However, the lithium deposited on charge grows into dendrites, which could cause problematic internal short-circuiting.

On the other hand, rechargeable lithium batteries are reported using an electrode composed of aluminum, silicon, tin or the like which alloys electrochemically with lithium during charge (Solid State Ionics, 113–115, p57(1998)).

However, the use of these metals that alloy with lithium (Li) for the negative electrode material has problematically resulted in the failure to obtain sufficient cycle characteristics because such active electrode materials undergo large expansion and shrinkage in volume as they store and release lithium and are pulverized and separated from the current collector.

DISCLOSURE OF THE INVENTION

It is an object of the present invention to provide an electrode for a rechargeable lithium battery, which solves these conventional problems and exhibits a high discharge capacity and excellent cycle characteristics and also provide a rechargeable lithium battery using the same.

The electrode for a rechargeable lithium battery, in accordance with the present invention, is characterized as including a layer composed of a metal that does not alloy with Li, a layer composed of a metal that alloys with Li, and a mixed layer interposed between these layers and composed of the metal that does not alloy with Li and the metal that alloys with Li.

In a first aspect in accordance with the present invention, a layer composed of a metal that alloys with Li is provided on a substrate composed of a metal that does not alloy with Li, and a mixed layer composed of these metals is interposed between the layer and the substrate.

In a second aspect in accordance with the present invention, a layer composed of a metal that does not alloy with Li is provided on a substrate composed of a metal that alloys with Li, and a mixed layer composed of these metals is interposed between the layer and the substrate.

In a third aspect in accordance with the present invention, a layer composed of a metal that alloys with Li is provided on a substrate composed of a metal that does not alloy with Li, and the metal in the substrate that does not alloy with Li is diffused into the layer so that a mixed layer is formed containing the metal that does not alloy with Li and the metal that alloys with Li. In this case, the layer provided on the substrate and composed of a metal that alloys with Li may be rendered into the mixed layer substantially in its entirety.

In the present invention, the mixed layer preferably has a thickness of 0.5 μm or above. If the mixed layer becomes excessively thin, the cycle characteristics improving effect as expected from formation of the mixed layer may not be obtained sufficiently.

In the present invention, the mixed layer is preferably divided into islands by gaps formed therein in a manner to extend in its thickness direction. Preferably, these gaps are formed on or after the first charge-discharge cycle. That is, the mixed layer, on or after the first charge-discharge cycle, preferably undergoes volumetric expansion and shrinkage to form therein such gaps whereby the mixed layer is divided into islands. Where a layer composed of a metal that alloys with Li is located to overlie the mixed layer, it is preferred that the layer is also divided into islands by gaps formed therein in a manner to extend in its thickness direction.

Also preferably, the mixed layer has irregularities on its surface. The above-described gaps are preferably formed along valleys of the irregularities. In the case where the mixed layer is formed to overlie the substrate, it is preferred that the substrate has irregularities on its surface and the corresponding irregularities are formed on a surface of the mixed layer.

When the mixed layer is divided into islands by the gaps formed therein in a manner to extend in its thickness direction, spaces are defined to surround the island portions. These spaces can accommodate changes in volume of the mixed layer containing active material as it expands and shrinks during charge and discharge, and thus suppress production of a stress in the mixed layer. This prevents fall-off or separation of the mixed layer from the substrate to result in obtaining satisfactory cycle characteristics.

The metal that does not alloy with Li, as used herein, refers to a metal that does not form a solid solution with Li, and specifically is a metal that does not show the presence of an alloy state in a metal-Li binary phase diagram. Examples of metals that do not alloy with Li include Cu, Fe, Ni, Co, Mo, W, Ta and the like.

The metal that alloys with Li, as used herein, refers to a metal that forms a solid solution or intermetallic compound with Li. Examples of metals that alloy with Li include Sn, Ge, Al, In, Mg and the like. Such metals that alloy with Li may be incorporated alone or in combination. That is, the layer or substrate composed of a metal that alloys with Li may be composed of an alloy containing two or more of the metals that alloy with Li. Preferably, these two or more alloy-constituting metals do not form an intermetallic compound with each other.

Where one of the metals that constitute the alloy is Sn, another metal may preferably be Pb, Zn, Bi, Al or the like. Accordingly, examples of such alloys include an alloy of Sn and Pb, an alloy of Sn and Zn, an alloy of Sn and Bi, an alloy of Sn and Al, and the like.

Preferably, a concentration of one metal in the alloy does not exceed 40% by weight. Where the alloy is an alloy of Sn and Pb or an alloy of Sn and Zn, the aforementioned one metal may preferably be Pb or Zn. That is, a Pb or Zn content of the alloy is preferably up to 40% by weight.

In the present invention, the mixed layer can be formed by providing a layer composed of a metal that alloys with Li on a layer or substrate composed of a metal that does not alloy with Li and then subjecting the stack to a heat treatment whereby the metal that does not alloy with Li is caused to diffuse into the layer or substrate composed of the metal that alloys with Li. For example, a Cu—Sn mixed layer can be formed by providing an Sn layer on a Cu substrate and then subjecting the stack to a heat treatment which causes Cu to diffuse into the Sn layer.

Alternatively, the mixed layer may be formed by providing a layer composed of a metal that does not alloy with Li on a layer or substrate composed of a metal that alloys with Li and then subjecting the resulting stack to a heat treatment. For example, a sequence of providing a Cu layer on an Sn substrate and subjecting the stack to a heat treatment results in the formation of an Sn—Cu mixed layer at an interface between the Sn substrate and the Cu layer.

The aforementioned heat treatment is preferably effected at a temperature lower than a melting point of the metal that does not alloy with Li or the metal that alloys with Li, whichever is lower. Specifically, the heat treatment may preferably be carried out at a temperature which is approximately 50%–95% of a melting point of either one of the metals, whichever is lower. In the case where Cu is used as the metal that does not alloy with Li and Sn is used as the metal that alloys with Li, since a melting point of Cu is 1085° C. and that of Sn is 232° C., the heat treatment may preferably be carried out at a temperature that is 50%–95% of the lower melting point, 232° C., i.e., at a temperature within the range of 116–220° C.

As will be described later, in the case where Cu is used as the metal that does not alloy with Li and Sn is used as the metal that alloys with Li, it has been demonstrated that the heat treatment is preferably effected at a temperature of 160–240° C., more preferably 180–240° C.

As described above, the heat treatment causes diffusion of the metal that does not alloy with Li and/or the metal that alloys with Li and results in the formation of the mixed layer which has a concentration gradient. In this invention, the mixed layer preferably has such a concentration gradient that the metal that alloys with Li increases its concentration and the metal that does not alloy with Li decreases its concentration toward the layer or substrate composed of the metal that alloys with Li. The concentration gradient in the mixed layer may vary either stepwise or continuously.

In the case of stepwise varying concentration gradient, the mixed layer comprises at least two superimposed layers which contain the metal that alloys with Li and the metal that does not alloy with Li at different concentration ratios. That is, if the metal that does not alloy with Li is represented by A and the metal that alloys with Li by B, the mixed layer comprises at least two layers having different A:B concentration ratios. For example, a first layer with a concentration ratio A:B=10:1–2:1 is provided on a layer or substrate composed of a metal that does not alloy with Li. A second layer with a concentration ratio A:B=4:1–1:1 is then provided on the first layer. These first and second layers constitute the mixed layer.

In the present invention, preferably, the mixed layer is positively formed to a thickness of 0.5 μm or greater, as described earlier. For example, when a thin film is vapor-or liquid-phase deposited on a substrate, a very thin mixed layer is occasionally formed between the substrate and the thin film. The present invention prefers the mixed layer formed positively such as by heat treatment to the such-formed mixed layer.

The mixed layer in the present invention is a layer wherein a metal that does not alloy with Li is mixed with a metal that alloys with Li. For example, the mixed layer may comprise an intermetallic compound of these metals, e.g., $Cu_6Sn_5$. Since the intermetallic compound generally has a specific composition, the mixed layer having a concentration gradient as previously described is constituted by superimposing plural layers having different compositions such as the aforementioned first and second layers.

Alternatively, the mixed layer in the present invention may comprise a solid solution of the metal that does not alloy with Li and the metal that alloys with Li. Whether the mixed layer comprises an intermetallic compound or a solid solution is determined by the types and proportions in composition of the metals mixed, the forming conditions of the mixed layer or the like. The mixed layer may also have a preferred orientation. The presence of orientation in the mixed layer conceivably increases cycle characteristics. Also, the mixed layer may have nano-order voids.

In the present invention, electrochemical processes such as electroplating and electroless plating, and physical thin-film forming processes such as CVD, sputtering, vapor evaporation and spraying can be utilized to deposit, in the form of a layer on the substrate, a metal that alloys with Li or a metal that does not alloy with Li. Subsequent to deposition of the layer of a metal that alloys with Li or a metal that does not alloy with Li, the resulting stack is subjected to a heat treatment or other process so that the mixed layer can be formed at an interface between the substrate and the layer.

In the present invention, the layer or substrate composed of a metal that does not alloy with Li is not particularly specified in thickness, nor is the layer or substrate composed of a metal that alloys with Li. However, the increase in thickness of these layers or substrates increases an overall thickness of an electrode and lowers an energy density of a battery, either gravimetric or volumetric. It is accordingly preferred that they have a thickness of up to about 50 μm.

In the present invention, the layer may be deposited on the substrate and then subjected to a heat treatment or the like so that the mixed layer is formed at an interface between the substrate and the layer. In this case, the substrate preferably has irregularities on its surface. The provision of such surface irregularities improves adhesion between the substrate and the active material and thus prevents separation of the active material during charge and discharge. Specifically, the surface roughness Ra of the substrate is preferably in the approximate range of 0.01–2 μm, more preferably 0.1–2 μm. The surface roughness Ra is defined in Japan Industrial Standards (JIS B 0601-1994) and can be determined as by a surface roughness meter.

In an exemplary case where a layer of a metal that alloys with Li, such as an Sn layer, is deposited on a Cu substrate, the use of an electrolytic copper foil which is a copper foil having a large surface roughness Ra is preferred.

In the present invention, provided between the layer or substrate composed of a metal that does not alloy with Li and the layer or substrate composed of a metal that alloys with Li is the mixed layer which contains a mixture of these metals. Due to the presence of such a mixed layer, the layer or substrate composed of a metal that alloys with Li can be kept well adhered to the layer or substrate composed of a metal that does not alloy with Li, even when the former layer or substrate expands and shrinks in volume as it stores and releases lithium during a charge-discharge reaction. This prevents fall-off, separation or the like of the layer or substrate composed of a metal that alloys with Li, which is an active material, and permits the electrode to undergo a charge-discharge reaction while collecting current in a satisfactory fashion. As a result, satisfactory cycle characteristics can be obtained.

In the present invention, a thin film which does not react with Li ions, permits passage of Li ions and has no ionic conductivity for Li ions may be provided on the layer or substrate composed of a metal that alloys with Li. That is, such a thin film may be provided on the layer or substrate which serves as active material. Specifically, the layer or substrate composed of a metal that alloys with Li carries on its one surface the layer or substrate composed of a metal that does not alloy with Li and on its other surface the thin film. The provision of the thin film prevents the layer or substrate composed of a metal that alloys with Li and serving as active material from growing into dendrites or being pulverized during charge and discharge.

As described above, the thin film is a thin film which does not react with Li ions, permits passage of Li ions and has no ionic conductivity for Li ions. Because the thin film does not react with Li ions, the thin film itself is not alloyed and thus undergoes neither expansion nor shrinkage. Also because the thin film permits passage of Li ions, a battery reaction in the active material is not hindered. Also because the thin film does not have ionic conductivity for Li ions, unlike a solid electrolyte thin film, the thin film itself is not deformed during charge and discharge.

In the present invention, the thin film preferably has a volume resistivity of $10^{10}$ Ω·cm or below. The thin film having such good electronic conductivity can also serve as a current collector.

In the present invention, the thin film can be deposited as by CVD, sputtering or vapor evaporation techniques.

The thin film in accordance with the present invention is illustrated by a diamond-like carbon thin film or other hard carbon thin films. Such hard carbon thin films show no tendency to react with Li, permit passage of Li ions and have no ionic conductivity for Li ions. The preferred hard carbon thin film shows a Raman scattering spectrum in which a ratio (Id/Ig) of a peak intensity (Id) around 1,400 cm$^{-1}$ to a peak intensity (Ig) around 1,550 cm$^{-1}$ is 0.5–3.0.

As stated earlier, such a hard carbon thin film preferably has a volume resistivity of $10^{10}$ Ω·cm or below. A typical example of the hard carbon thin film having such good conductivity is a hard carbon thin film containing $CO_2$ molecules. The hard carbon thin film containing $CO_2$ molecules can be deposited by a CVD process using a mixed gas of $CO_2$ and hydrocarbon as a source gas. Also, the deposited hard carbon thin film may be subjected to a surface treatment with a $CO_2$-containing gas so that an electrically conductive property is imparted to a surface of the hard carbon thin film.

While not particularly limited, the thickness of the thin film is preferably in the approximate range of 50–1,000 nm, more preferably in the approximate range of 100–500 nm. If the thin film is excessively thin, its effect that prevents the active material from being separated from the current collector or growing into dendrites may become insufficient. On the other hand, if the thin film is excessively thick, it may restrict the passage of Li ions during charge and discharge to result occasionally in an insufficient reaction between the active material and the Li ions.

In the present invention, an interlayer may be provided between the thin film and the layer or substrate composed of a metal that alloys with Li, i.e., between the thin film and the active material. One purpose in providing such an interlayer is to improve adhesion between the thin film and the active material. The interlayer may comprise at least one selected from Si, Ti, Zr, Ge, Ru, Mo, W and their oxides, nitrides and carbides. The interlayer preferably has a thickness in the approximate range of 10–500 nm. The interlayer can be formed by a CVD, sputtering, vacuum deposition or plating process, for example.

The rechargeable lithium battery of the present invention is characterized as including a negative electrode comprised of the above-described electrode of the present invention, a positive electrode and a nonaqueous electrolyte.

An electrolyte solvent for use in the rechargeable lithium battery of the present invention is not particularly specified in type but can be illustrated by a mixed solvent which contains cyclic carbonate such as ethylene carbonate, propylene carbonate, butylene carbonate or vinylene carbonate and also contains chain carbonate such as dimethyl carbonate, methyl ethyl carbonate or diethyl carbonate. Also applicable is a mixed solvent of the above-listed cyclic carbonate and an ether solvent such as 1,2-dimethoxyethane or 1,2-diethoxyethane. Examples of electrolyte solutes include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$ and mixtures thereof. Other applicable electrolytes include gelled polymer electrolytes comprised of an electrolyte solution impregnated into polymer electrolytes such as polyethylene oxide, polyacrylonitrile and polyvinylidene fluoride; and inorganic solid electrolytes such as LiI and $Li_3N$, for example. The electrolyte for the rechargeable lithium battery of the present invention can be used without limitation, so long as an Li compound as its solute that imparts ionic conductivity, together with its solvent that dissolves and retains the Li compound, remain undecomposed at voltages during charge, discharge and storage of the battery.

Examples of useful active materials for the positive electrode of the rechargeable lithium battery of the present invention include lithium-containing transition metal oxides such as $LiCoO_2$, $LiNiO_2$, $LiMn_2O_4$, $LiMnO_2$, $LiCo_{0.5}Ni_{0.5}O_2$ and $LiNi_{0.7}Co_{0.2}Mn_{0.1}O_2$; and lithium-free metal oxides such as $MnO_2$. Other substances can also be used, without limitation, if they are capable of electrochemical lithium insertion and deinsertion.

BEST MODE FOR CARRYING OUT THE INVENTION

The present invention is below described in more detail by way of Examples. It will be recognized that the following examples merely illustrate the practice of the present invention but are not intended to be limiting thereof. Suitable changes and modifications can be effected without departing from the scope of the present invention.

Experiment 1

(Fabrication of Electrodes)

A 2 μm thick Sn layer was deposited on a 18 μm thick electrolytic copper foil (surface roughness=0.188 μm) by an electrolytic plating process. Sn was used for an anode. A plating bath having the composition specified in the following Table 1 was used.

TABLE 1

| Component | Concentration |
| --- | --- |
| Stannous Sulfate | 40 g · dm$^{-3}$ |
| Sulfuric Acid | 150 g · dm$^{-3}$ |
| Formalin | 5 cm$^3$ · dm$^{-3}$ |
| Additive (Product of UYEMURA & Co., Ltd.) | 40 cm$^3$ · dm$^{-3}$ |

After deposition of the Sn layer, the resulting stack was cut into a 2 cm×2 cm size and then heat-treated at 200° C. for 24 hours to obtain an electrode a1.

For a comparative purpose, the above procedure was repeated, except that the heat treatment was not carried out, to fabricate an electrode b1.

Figure 1:
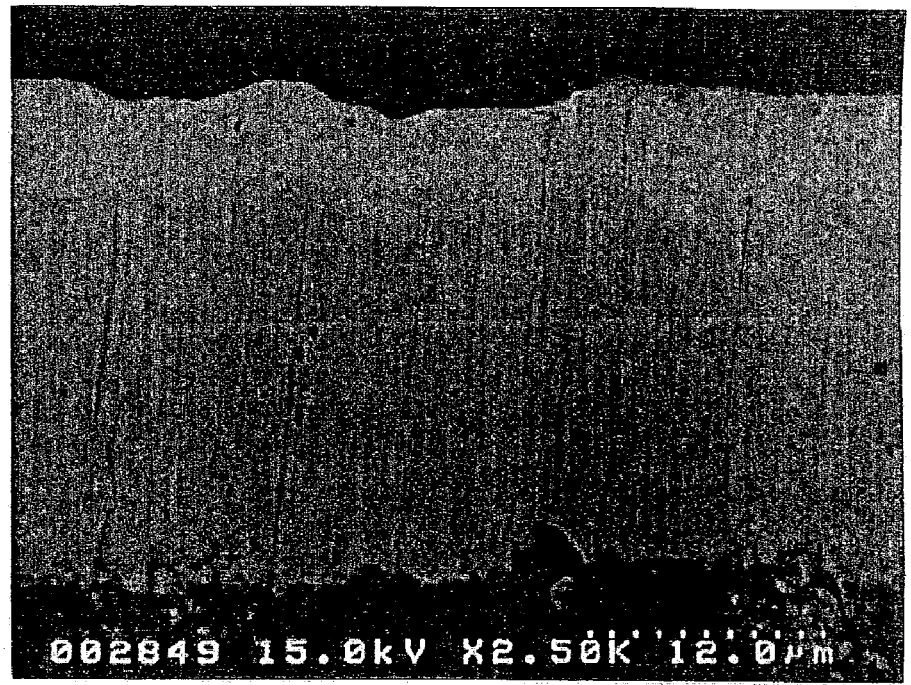
FIG. 1 is a photomicrograph taken using a scanning electron microscope, showing a section of the electrode a1 of Example in accordance with the present invention.
Figure 2:
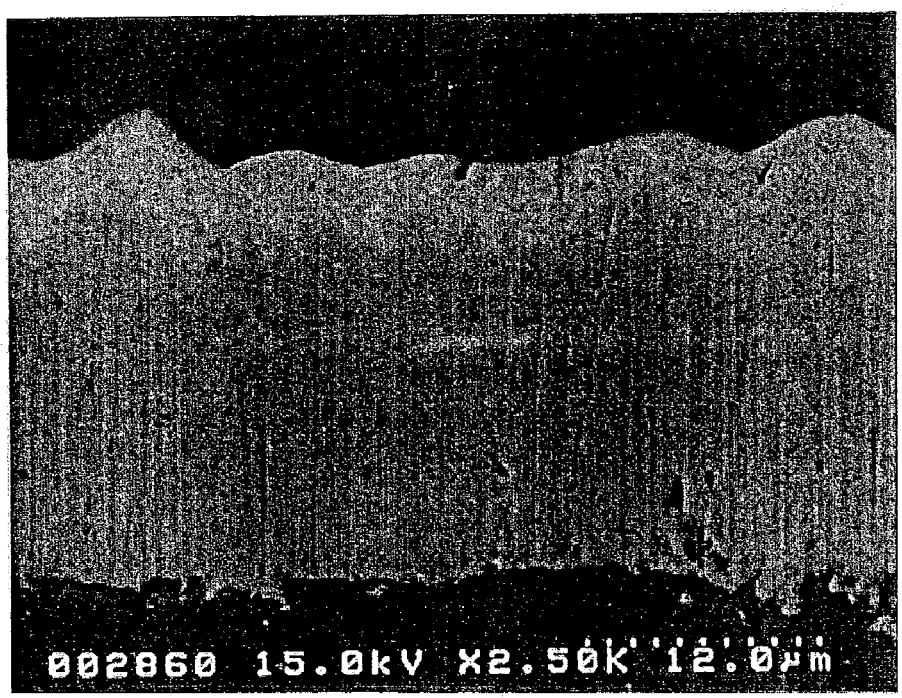
FIG. 2 is a photomicrograph taken using a scanning electron microscope, showing a cross-section of the electrode b1 of Comparative Example.

FIG. 1 is a photomicrograph taken using a scanning electron microscope, showing a cross-section of the electrode a1. FIG. 2 is a photomicrograph taken using a scanning electron microscope, showing a cross-section of the electrode b1. Both were taken at a magnification of 2,500×. In FIG. 2 which shows the electrode b1 without heat treatment, an upper portion which appears lightened is the Sn layer and a lower portion which appears slightly dark is the Cu substrate. As apparent from FIG. 1 which shows the heat-treated electrode a1, the application of heat treatment confines the portion of the Sn layer that appears lightened in a thinner surface region. This demonstrates that Cu in the Cu substrate is diffused into the Sn layer to form a mixed layer of Cu and Sn. It is also observed in the mixed layer that an Sn concentration increases and a Cu concentration decreases toward the surface Sn layer.

Figure 3:
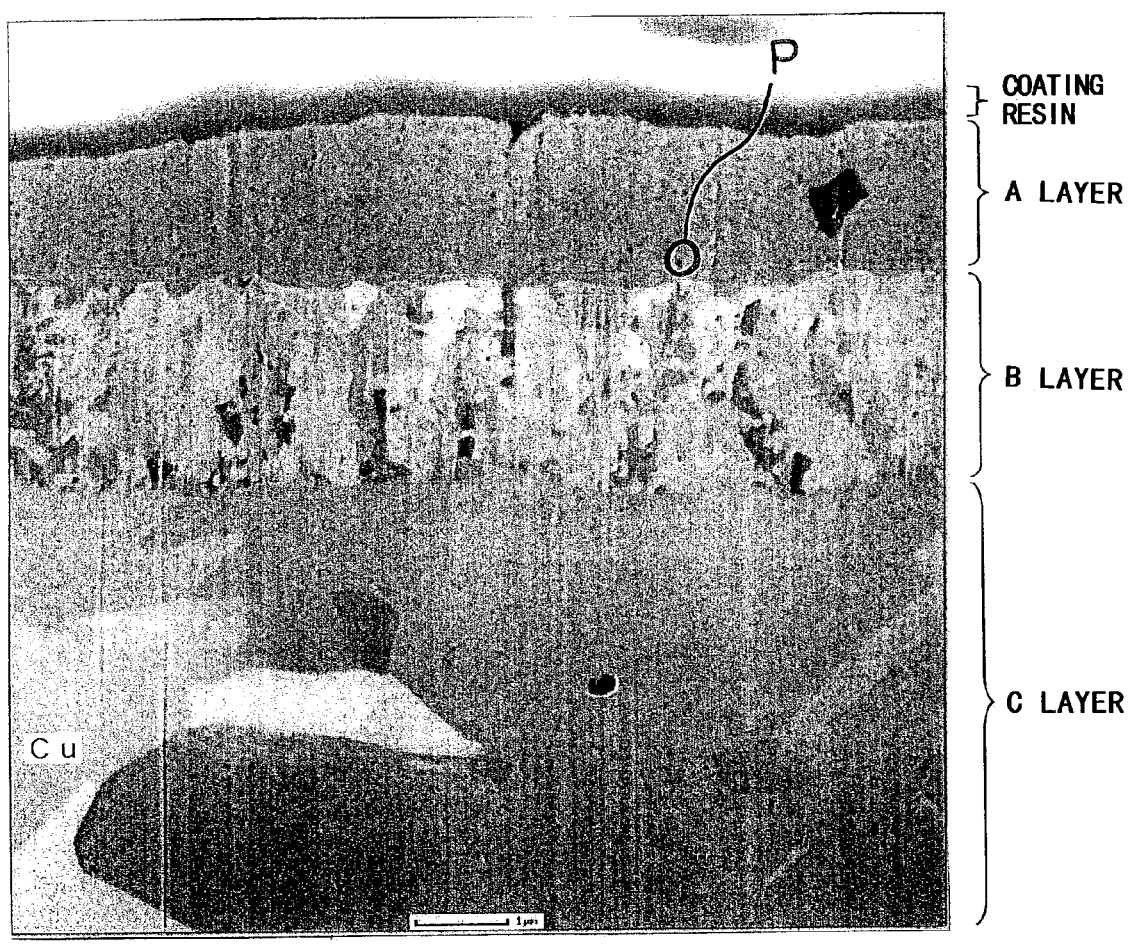
FIG. 3 is a photomicrograph taken using a scanning ion microscope, showing a cross-section of the electrode a1 of Example in accordance with the present invention.

FIG. 3 is a photomicrograph taken using a scanning ion microscope, showing the cross-section of the electrode a1.

Figure 4:
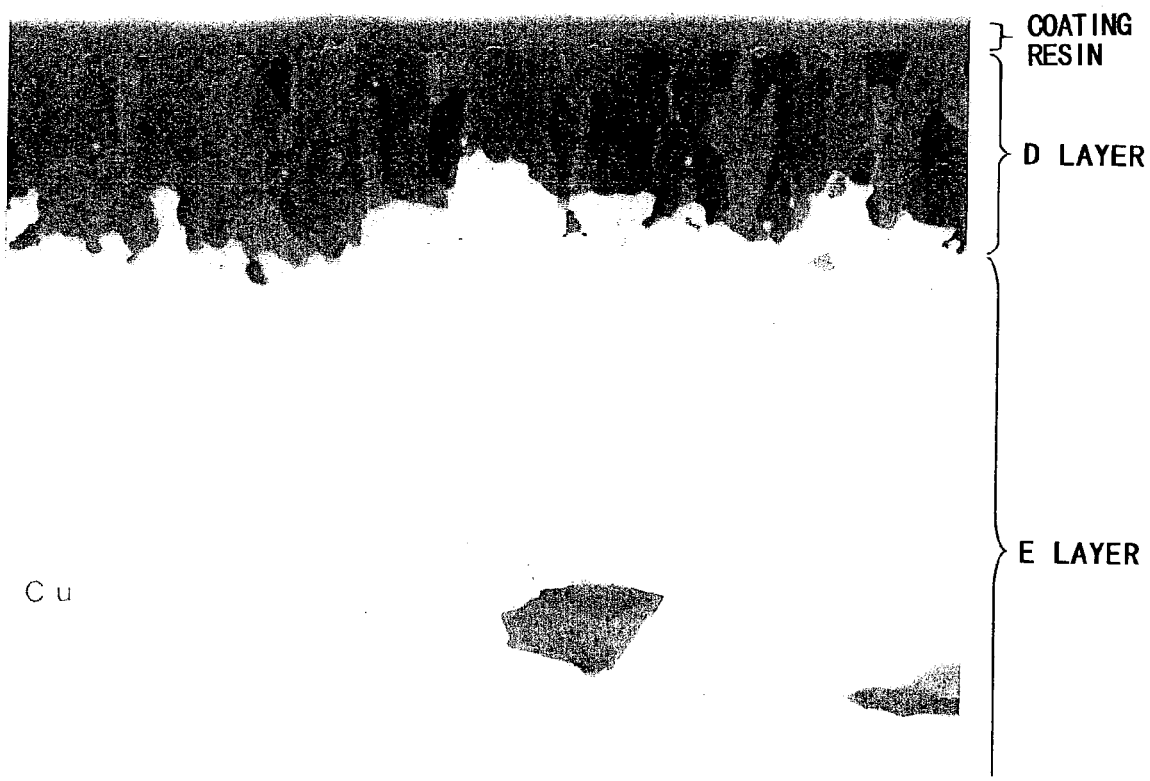
FIG. 4 is a photomicrograph taken using a scanning ion microscope, showing a cross-section of the electrode b1 of Comparative Example.

FIG. 4 is a photomicrograph taken using a scanning ion microscope, showing the cross-section of the electrode b1. Both were taken at a magnification of 13,500×. As shown in FIG. 3, the electrode a1 has A and B layers formed on a C layer. Observed on the A layer is a layer of a coating resin applied onto an electrode surface for fabrication of an observation sample. As shown in FIG. 4, the electrode b1 has a D layer formed on an E layer. Observed on the D layer is a thin layer of a coating resin as similar to the above.

Figure 5:
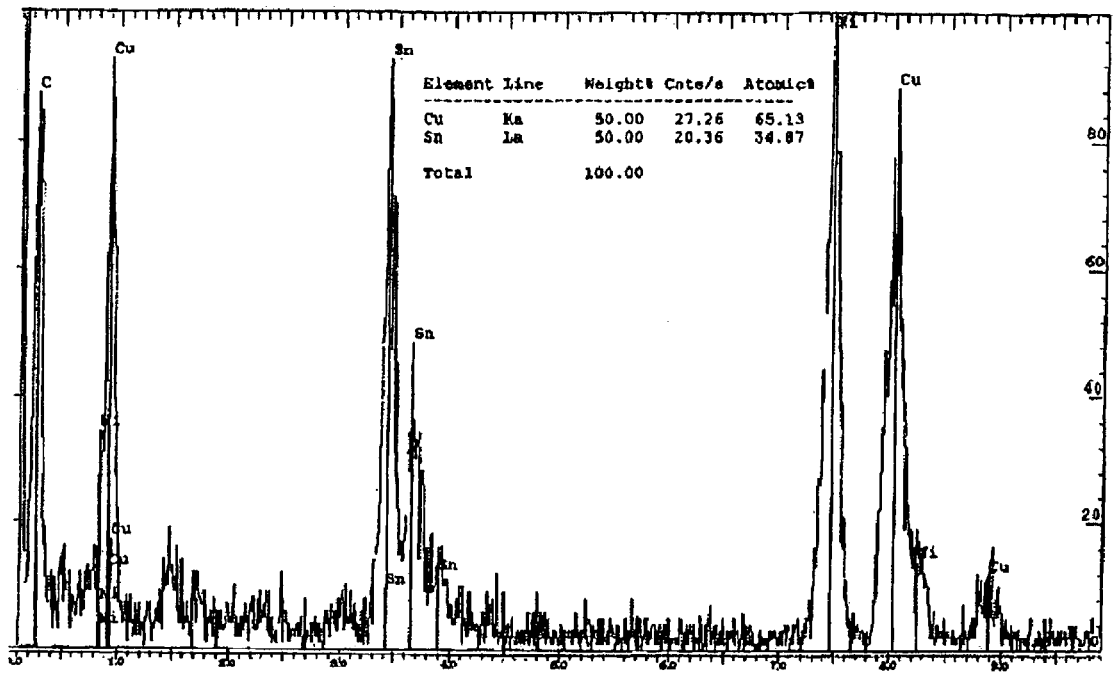
FIG. 5 is a chart, showing the X-ray microanalysis result of the A layer shown in FIG. 3.
Figure 6:
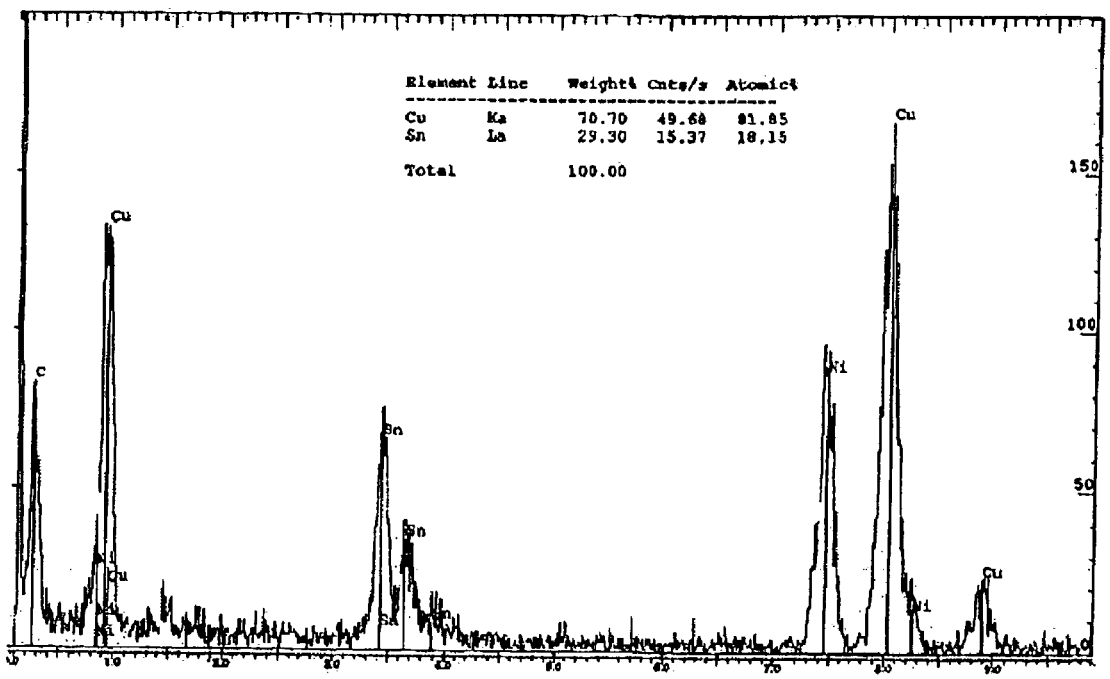
FIG. 6 is a chart, showing the X-ray microanalysis result of the B layer shown in FIG. 3.
Figure 7:
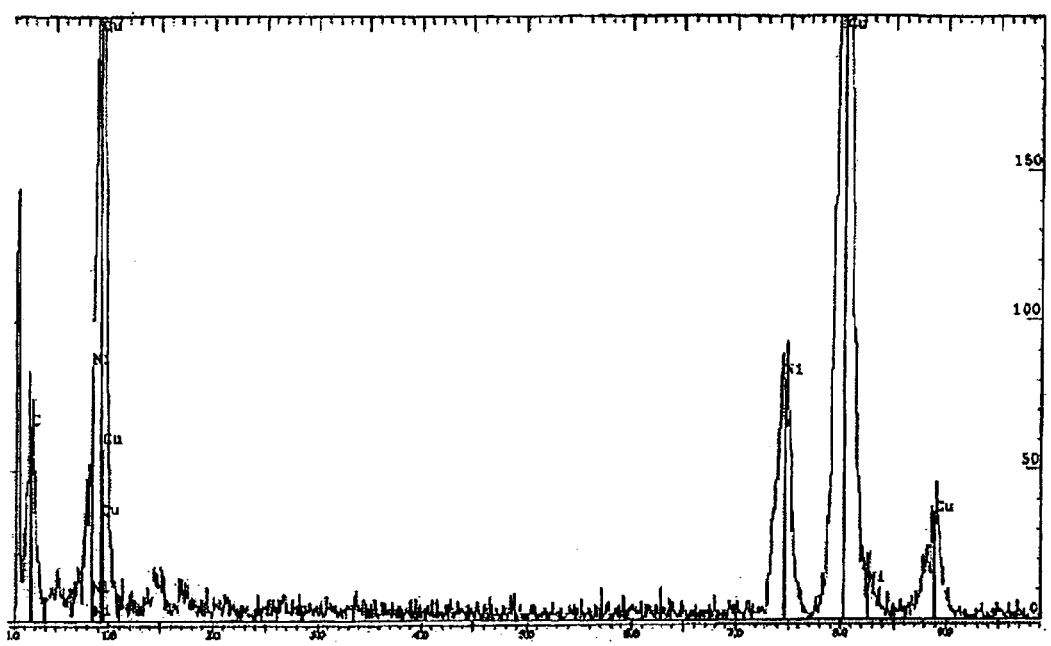
FIG. 7 is a chart, showing the X-ray microanalysis result of the C layer shown in FIG. 3.
Figure 8:
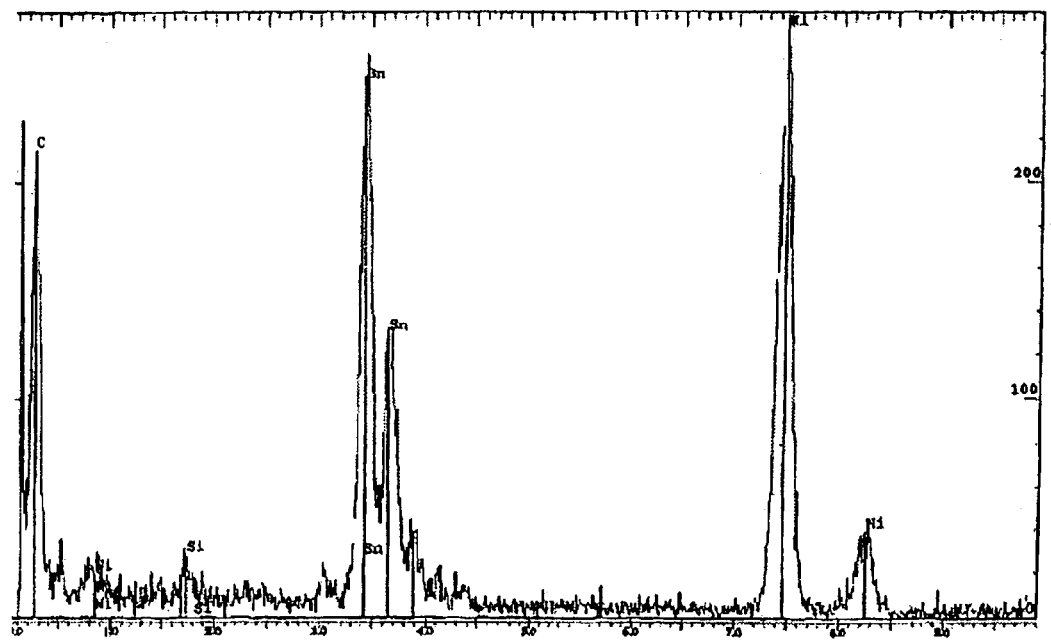
FIG. 8 is a chart, showing the X-ray microanalysis result of the D layer shown in FIG. 4.
Figure 9:
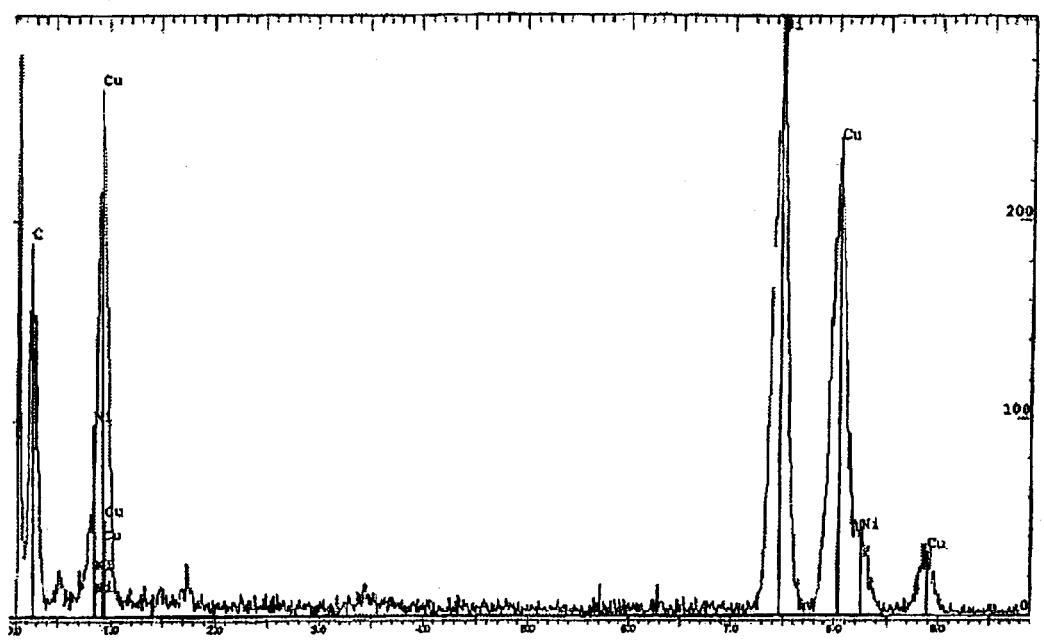
FIG. 9 is a chart, showing the X-ray microanalysis result of the E layer shown in FIG. 4.

FIGS. 5, 6 and 7 are charts indicating respective compositions of the A, B and C layers in the electrode a1 shown in FIG. 3 when analyzed by an X-ray microanalyzer (XMA). FIGS. 8 and 9 are charts indicating respective compositions of the D and E layers in the electrode b1 shown in FIG. 4 when analyzed by an X-ray microanalyzer (XMA).

As can be appreciated from the results shown in FIGS. 8 and 9, the D layer observed as being a dark portion in FIG. 4 is the Sn layer and the E layer observed as being a light portion is the Cu foil substrate.

From the results shown in FIG. 7, the C layer in FIG. 3 is identified as the Cu foil substrate. Also from the results shown in FIGS. 5 and 6, each of the A and B layers shown in FIG. 3 is identified as a mixed layer of Sn and Cu. The peak intensities in the chart shown in FIG. 5 indicate the A layer as having a composition with Sn:Cu=1:2. The peak intensities in the chart shown in FIG. 6 indicate the B layer as having a composition with Sn:Cu=1:4.5. The A and B layers each has a specific proportion of the components and a specific crystal structure throughout the layer. This suggests that each layer is an intermetallic compound of Sn and Cu. From the photograph shown in FIG. 3, the A layer is found to be 1.7 μm thick and the B layer to be 2.2 μm thick. The Ni peaks observed in the charts shown in FIGS. 5–9 are those from sample holders.

As indicated by P in FIG. 3, a number of voids exists in the A layer which is the mixed layer. These voids have sizes ranging from several tens to several hundreds nanometers, i.e., have nano-order sizes. The presence of such voids relaxes volumetric expansion and shrinkage during charge and discharge and is thus considered to contribute to the improvement in cycle characteristics.

In FIG. 3, the A layer is about 1.8 μm thick and the B layer is about 2.2 μm thick.

Figure 13:
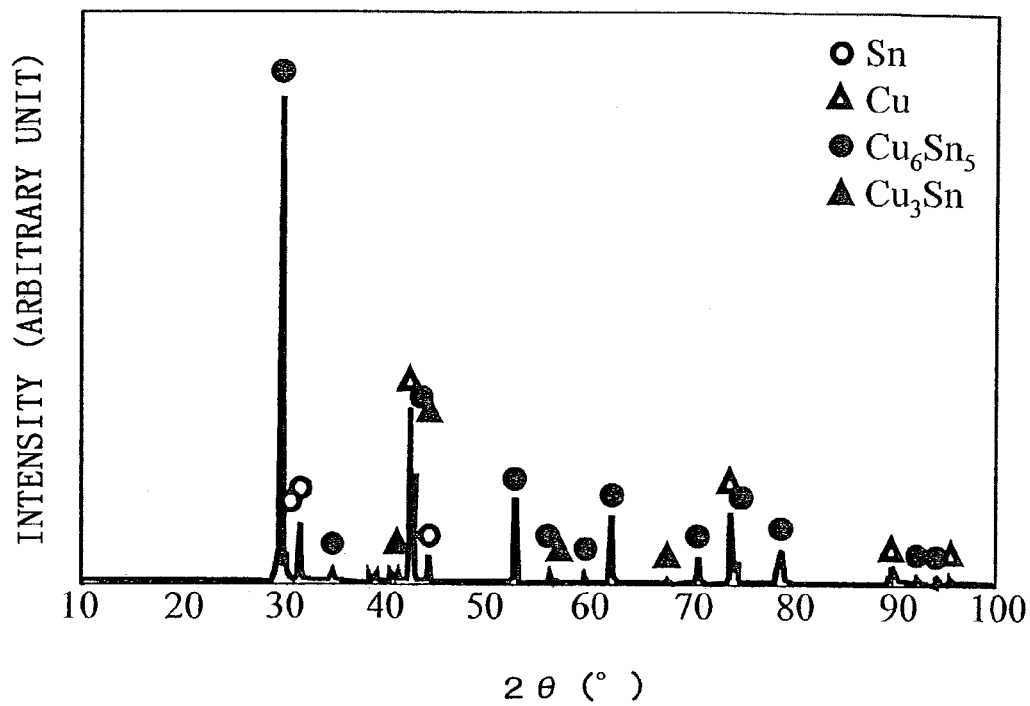
FIG. 13 is a view, showing an X-ray diffraction pattern of the electrode a1 of Example in accordance with the present invention.
Figure 14:
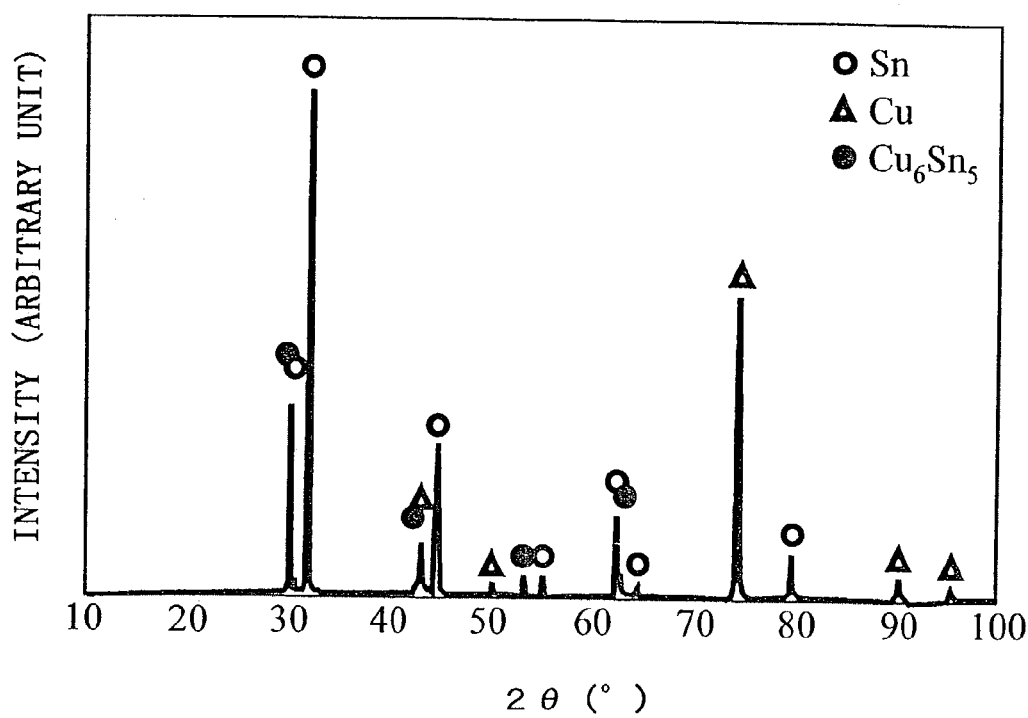
FIG. 14 is a view, showing an X-ray diffraction pattern of the electrode b1 of Comparative Example.

FIG. 13 is an X-ray diffraction pattern obtained for the electrode a1. FIG. 14 is an X-ray diffraction pattern obtained for the electrode b1.

As apparent from FIG. 14, an intermetallic compound of tin (Sn) and copper (Cu), probably $Cu_6Sn_5$, is found to be present in a slight amount even in the electrode b1 without heat treatment. This suggests that the mere plating of tin on the copper foil results in the formation of a slight amount of an tin-copper intermetallic compound. Although supposed to be present at an interface between the plated tin layer and the copper foil as a current collector, such an intermetallic compound is not perceived in the electron photomicrograph of FIG. 4. It is accordingly considered that a thickness of this intermetallic compound is very small, probably below 0.5 μm.

As shown in FIG. 13, an intermetallic compound of $Cu_6Sn_5$ and $Cu_3Sn$ is identified as being present in the electrode a1. By the comparison thereof to the results from the preceding X-ray microanalysis, the A layer having a composition with Cu:Sn=2:1 is considered as corresponding to $Cu_6Sn_5$ and the B layer having a composition with Cu:Sn=4.5:1 to $Cu_3Sn$. It is accordingly considered the A layer, i.e., $Cu_6Sn_5$, as being a main active material in a reaction with lithium. Since the presence of simple Sn is identified in FIG. 13, the simple Sn is supposed to exist on a surface the A layer. However, it is not perceived in the electron photomicrograph of FIG. 3. Its thickness is thus considered to be 0.5 μm or below.

From the comparison of peak intensities shown in FIG. 13 to the intensity ratio given in the JCPDS card, Sn and $Cu_6Sn_5$ appear to be oriented in a specific direction. Such orientation of the active material is considered to be another contributor to the improved cycle characteristics.

(Preparation of Electrolyte Solution)

1 mole/liter of $LiPF_6$ was dissolved in a mixed solvent containing ethylene carbonate and diethyl carbonate at a 1:1 ratio by volume to prepare an electrolyte solution.

(Construction of Beaker Cell)

Figure 10:
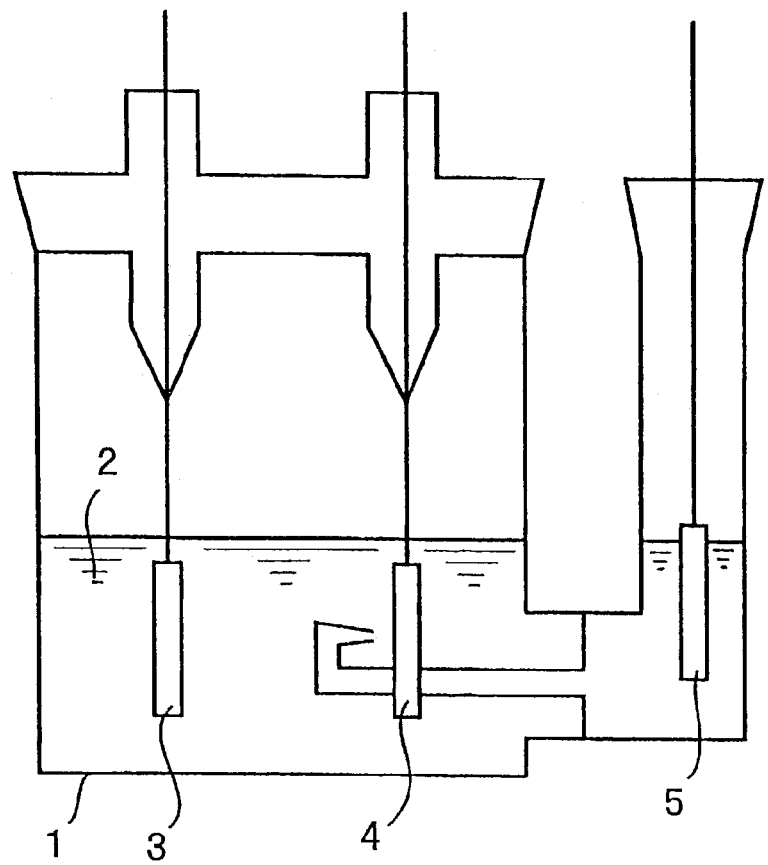
FIG. 10 is a schematic cross-sectional view, showing the beaker cell constructed in Example.

Using each of the above-fabricated electrodes a1 and b1 as a working electrode, a beaker cell as shown in FIG. 10 was constructed. As shown in FIG. 10, the beaker cell includes a counter electrode 3, a working electrode 4 and a reference electrode 5, which are all immersed in an electrolyte solution contained in a container 1. The above-prepared electrolyte solution was used as the electrolyte solution 2. Metallic lithium was used for both the counter electrode 3 and the reference electrode 5.

(Evaluation of Cycle Characteristics)

Each of the above-constructed beaker cells was charged at 25° C. at a constant current of 0.2 mA to 0 V (vs. $Li/Li^+$) and then discharged at a constant current of 0.2 mA to 2 V (vs. $Li/Li^+$). This unit cycle was repeated 10 times to determine a cycle efficiency which is defined by the following equation. The results are given in Table 2. In this beaker cell, reduction of the working electrode takes place during charge and oxidation thereof takes place during discharge.

Cycle Efficiency (%)=(10th-cycle discharge capacity/1st-cycle discharge capacity)×100

TABLE 2

| Electrode | Cycle Efficiency (%) |
|---|---|
| a1 | 80 |
| b1 | 17 |

As can be clearly seen from the results shown in Table 2, the electrode a1 including the mixed layer formed at an interface between Cu and Sn by heat treatment exhibits the increased cycle efficiency compared to the electrode b1 without heat treatment. This is considered due probably to the presence of the mixed layer which prevents separation of the Sn layer from the Cu substrate during charge-discharge cycles.

Figure 15:
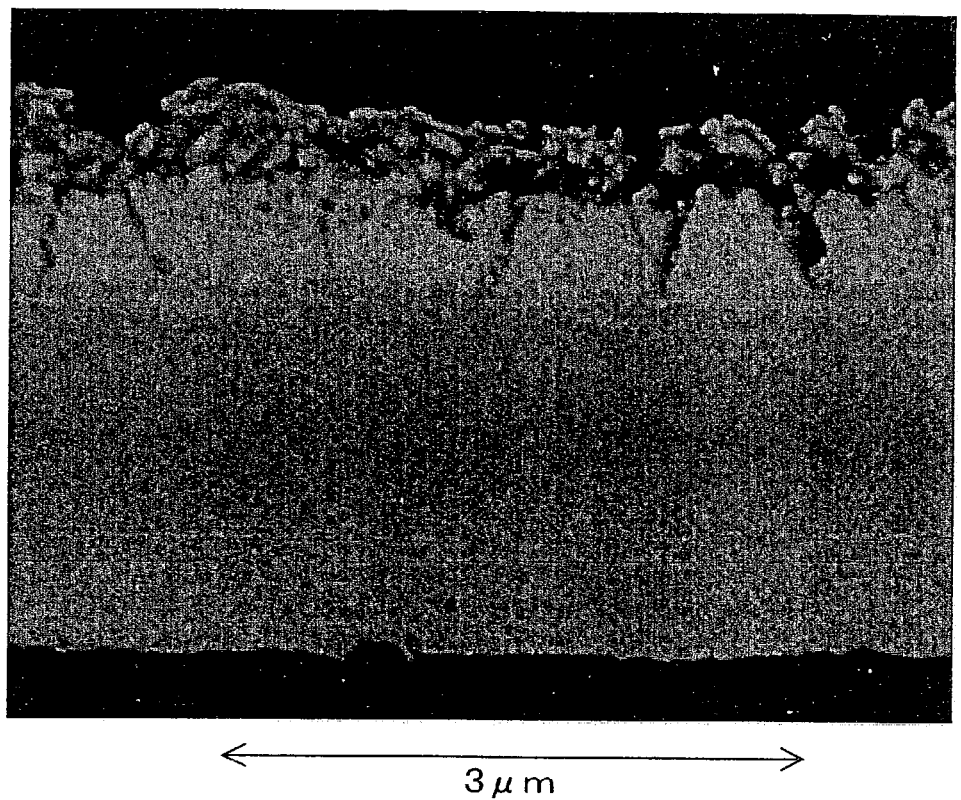
FIG. 15 is a photomicrograph taken using a scanning electron microscope, showing a cross-section of the electrode a1 after charge and discharge (1st cycle)
Figure 16:
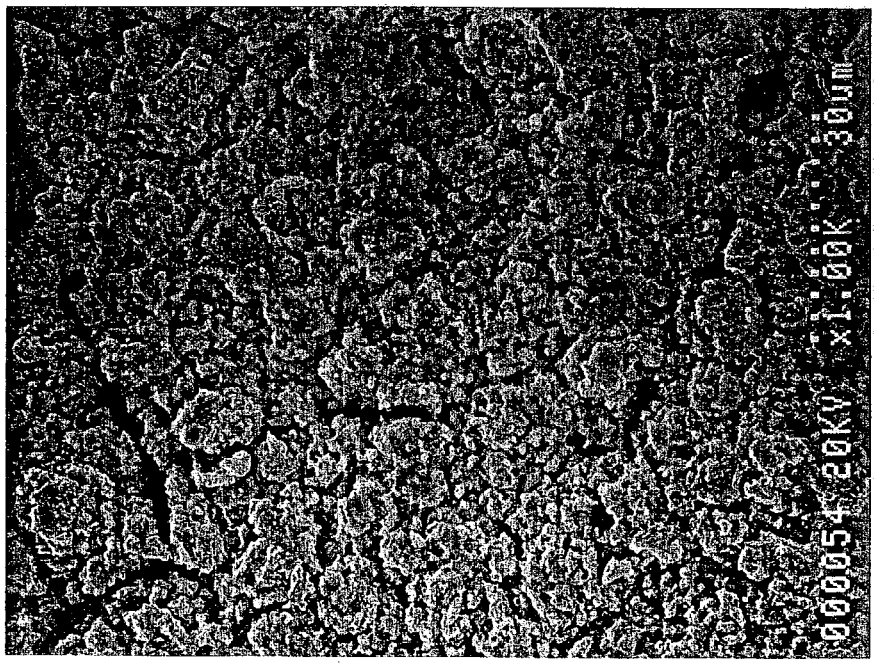
FIG. 16 is a photomicrograph taken using a scanning electron microscope, showing a surface of the electrode a1 after charge and discharge (1st cycle)

The electrode a1 after the first cycle in the above-described charge-discharge cycle test was observed using a scanning electron microscope. FIG. 15 is a photomicrograph taken using a scanning electron microscope, showing a cross-section of the electrode a1 after charge and discharge. FIG. 16 is a photomicrograph taken using a scanning electron microscope, showing the electrode after the charge-discharge cycle test when viewed from above. FIG. 15 is taken at a magnification of 500×. FIG. 16 is taken at a magnification of 1,000×.

Figure 17:
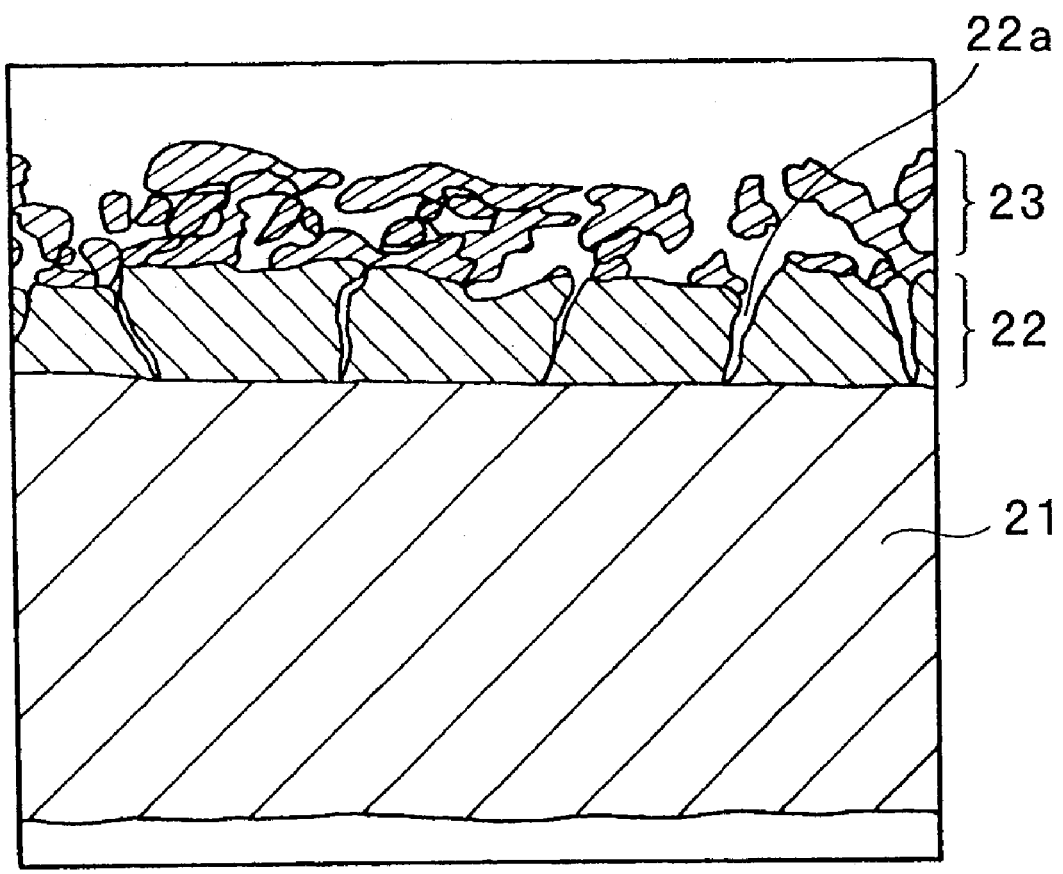
FIG. 17 is view, schematically showing the electron photomicrograph of FIG. 15.

FIG. 17 schematically illustrates the photomicrograph taken using a scanning electron microscope and shown in FIG. 15. As can be clearly seen from FIGS. 15 and 17, the B layer 22, which is the mixed layer provided on the C layer 21 in the form of the copper foil, has gaps 22a formed therein in a manner to extend in its thickness direction. As apparent from FIG. 16, the A and B layers, which are both the mixed layers, are divided into islands by such-formed gaps. The A and B layers when divided into islands are surrounded by spaces. These surrounding spaces can accommodate changes in volume of such layers as they expand and shrink during a charge-discharge reaction and suppress production of a stress. As a result, pulverization of the active material, located close to the current collector and above there, can be prevented. Further, separation of the active material from the current collector can be prevented, resulting in the successful improvement of cycle characteristics.

Experiment 2

(Fabrication of Electrode)

A 2 μm thick, Sn—Pb alloy layer was deposited on an electrolytic copper foil, similar to that used in Experiment 1, by an electrolytic plating process. An Sn—Pb alloy was used for an anode. A plating bath similar to that used in Experiment 1 was used.

After deposition of the Sn—Pb layer, the resulting stack was cut into a 2 cm×2 cm size and then heat-treated at 200° C. for 24 hours to obtain an electrode c1.

As analogous to Experiment 1, the fabricated electrode c1 was observed using a scanning electron microscope, a scanning ion microscope and an X-ray microanalyzer (XMA) The results confirmed the formation of a mixed layer of Cu, Sn and Pb at an interface between the Cu substrate and the Sn—Pb alloy layer.

(Measurement of Cycle Performance)

Using the electrode c1 as a working electrode, a beaker cell was constructed in a similar manner to Experiment 1. The beaker cell thus constructed was charged and discharged in the same manner as in Experiment 1. The cycle efficiency was determined to be 88%. The improved cycle efficiency relative to the beaker cell a1 incorporating the Sn layer was obtained for the beaker cell in this Experiment.

Experiment 3

Rechargeable lithium batteries were constructed using the electrodes a1 and b1 obtained in Experiment 1 and the electrode c1 obtained in Experiment 2 as their respective negative electrodes, and then evaluated for charge-discharge cycle characteristics.

(Fabrication of Positive Electrode)

85% by weight of $LiCoO_2$ powder with a mean particle diameter of 10 μm, 10% by weight of carbon powder as an electrically conducting agent and 5% by weight of polyvinylidene fluoride powder were mixed. After addition of N-methylpyrrolidone thereto, the mixture was kneaded to prepare a slurry. The slurry was coated onto one surface of a 20 μm thick aluminum foil by a doctor blade technique and then dried. A 2 cm×2 cm piece was cut out from the coated aluminum foil to fabricate a positive electrode.

(Construction of Battery)

The above-fabricated positive electrode and the electrode a1, b1 or c1 were combined together through a polyethylene microporous membrane and then inserted into a casing comprised of laminated aluminum material. Subsequently, 500 μl of an electrolyte solution similar to that prepared in Experiment 1 was introduced into the casing to thereby construct a rechargeable lithium battery.

Figure 11:
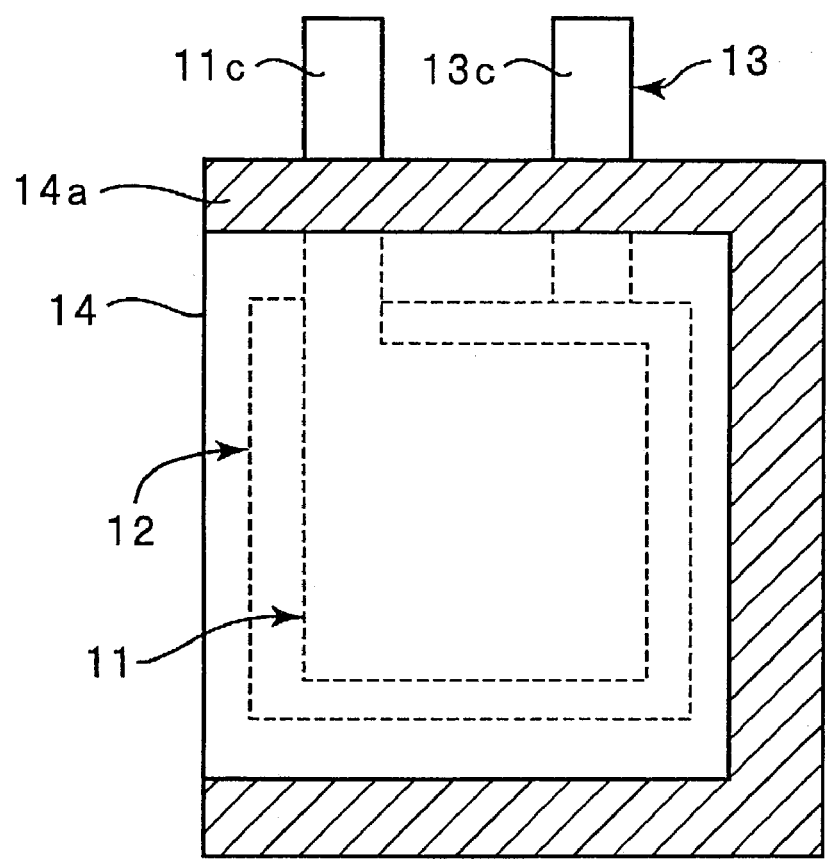
FIG. 11 is a plan view, showing the rechargeable lithium battery constructed in Example.

FIG. 11 is a plan view of the rechargeable lithium battery such constructed. As shown in FIG. 11, the positive electrode 11 and the negative electrode 13 are assembled with a separator 12 comprised of a polyethylene microporous membrane between them, and then inserted into a casing 14. After insertion of the assembly into the casing 14, the electrolyte is poured. Subsequently, the casing 14 is sealed at its region 14a to complete construction of the rechargeable lithium battery.

Figure 12:
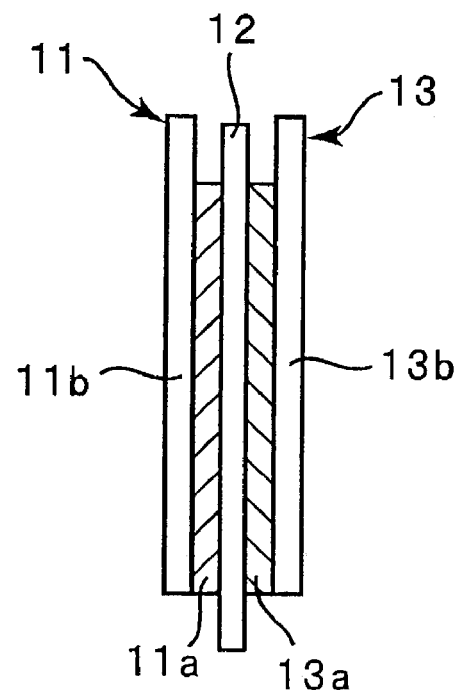
FIG. 12 is a cross-sectional view, showing a construction by which the electrodes are assembled for the rechargeable lithium battery shown in FIG. 11.

FIG. 12 is a cross-sectional view, showing a construction by which the electrodes are assembled within the battery. As shown in FIG. 12, the positive electrode 11 and the negative electrode 13 are assembled to locate in opposite sides of the separator 12. The positive electrode 11 has a layer 11a of positive active material provided on a positive current collector 11b made of aluminum. This layer 11a of positive active material is located in contact with the separator 12. Likewise, the negative electrode 13 has a layer 13a of negative active material provided on a negative current collector 13b made of copper. This layer 13a of positive active material is located in contact with the separator 12. In this embodiment, the layer 13a of negative active material is a layer composed of Sn or an Sn—Pb alloy.

As shown in FIG. 11, a positive tab 11c made of aluminum is attached to the positive current collector 11b for extension toward an exterior of the casing. Likewise, a negative tab 13c made of nickel is attached to the negative current collector 13b for extension toward an exterior of the casing.

The rechargeable lithium batteries constructed using the electrodes a1, b1 and c1 as their respective negative electrodes were designated as the batteries A1, B1 and C1, respectively. A designed capacity of each battery was 5.0 mAh.

(Charge-Discharge Test)

The above-constructed batteries A1, B1 and C1 were subjected to a charge-discharge test. Each battery was charged at a constant current of 1.0 mA to 4.0 V and then discharged at a constant current of 1.0 mA to 2.0 V. This unit cycle was repeated and a cycle efficiency after 10 cycles was determined from the equation defined in Experiment 1. Measurement was carried out at 25° C.

TABLE 3

| Battery | Cycle Efficiency (%) |
| --- | --- |
| Battery A1 (Sn Layer: Heat-Treated) | 86 |
| Comp. Battery B1 (Sn Layer: Not Heat-Treated) | 33 |
| Battery C1 (Sn—Pb Layer: Heat-Treated) | 91 |

As shown in Table 3, the batteries A1 and C1 in accordance with the present invention are proved to exhibit improved cycle characteristics compared to the comparative battery B1.

Experiment 4

As analogous to Experiment 1, a 2 μm thick Sn layer was deposited on an electrolytic copper foil by an electrolytic plating process. A 2 cm×2 cm piece was cut out from the resulting stack and then subjected to a heat treatment. The heat treatment was carried out at temperatures of 160° C., 180° C., 200° C., 220° C. and 240° C. The heat treatment at each temperature was continued for a duration of 24 hours. As a result, an electrode d1 (heat-treated at 160° C.), an electrode d2 (heat-treated at 180° C.), an electrode d3 (heat-treated at 200° C.), an electrode d4 (heat-treated at 220° C.) and an electrode d5 (heat-treated at 240° C.) were obtained. The electrode d3 was identical to the electrode a1 in Experiment 1.

A beaker cell was constructed using each electrode and then subjected to 10 cycles of charges and discharges to determine a cycle efficiency in the same manner as in Experiment 1. The results are shown in Table 4. In Table 4, the result for the comparative electrode b1 in Experiment 1 is also shown.

TABLE 4

| Electrode | Cycle Efficiency (%) |
| --- | --- |
| Electrode d1 (Heat-Treated at 160° C.) | 50 |
| Electrode d2 (Heat-Treated at 180° C.) | 67 |
| Electrode d3 (Heat-Treated at 200° C.) | 80 |
| Electrode d4 (Heat-Treated at 220° C.) | 76 |
| Electrode d5 (Heat-Treated at 240° C.) | 71 |
| Comp. Electrode b1 (Not Heat-Treated) | 17 |

As can be appreciated from the results shown in Table 4, in the case where Cu is used as a metal that does not alloy with Li and Sn is used as a metal that alloys with Li, the electrodes fabricated with heat treatment at temperatures within the range of 160° C.–240° C., preferably within the range of 180° C.–240° C., provide satisfactory results. The heat treatment, if applied in such a temperature range, successfully increases a cycle efficiency.

Experiment 5

As analogous to Experiment 1, a 2 μm thick Sn layer was deposited on an electrolytic copper foil and then heat-treated at 200° C. for 24 hours. Subsequently, an Si thin film (20 nm thick), as an interlayer, was deposited on the Sn layer by an RF sputtering technique. This thin film was deposited at a target RF voltage of 200 W and a substrate bias voltage of −100 V.

Thereafter, a hard carbon thin film (diamond-like carbon thin film: DLC thin film) was deposited on the Si thin film by a CVD process. A thickness of the thin film was controlled at 200 nm. The hard carbon thin film was deposited by an ion beam CVD process under the conditions of a $CH_4$ gas flow rate of 40 sccm, a $CO_2$ gas flow rate of 10 sccm, 330 W microwave power from an ECR plasma source and an ion beam acceleration voltage of 200 V.

The resulting hard carbon thin film was found to have a volume resistivity of about $10^9$ Ω·cm. Also, measurement of a Raman scattering spectrum of the hard carbon thin film revealed a ratio (Id/Ig) of a peak intensity Id around 1,400 $cm^{-1}$ to a peak intensity Ig around 1,550 $cm^{-1}$ as being about 1.1.

The above-fabricated stack was cut into a 2 cm×2 cm size to obtain an electrode e1. A beaker cell was constructed using the electrode e1 obtained and then subjected to 10 cycles of charges and discharges to determine a cycle efficiency in the same manner as in Experiment 1. The results are shown in Table 5. In Table 5, the results for the electrode a1 of the present invention as obtained in Experiment 1 and the comparative electrode b1 are also shown.

TABLE 5

| Electrode | DLC Film Thickness (nm) | Cycle Efficiency (%) |
| --- | --- | --- |
| Electrode a1 | 0 | 80 |
| Comp. Electrode b1 | 0 | 17 |
| Electrode e1 | 200 | 89 |

As apparent from Table 5, the provision of the hard carbon thin film on the layer of Sn active material improves a cycle efficiency.

After 10 cycles, the electrode e1 of the present invention was observed. While the layer of Sn active material was slightly pulverized at its surface, a shape of the electrode before charges and discharges was substantially sustained. Furthered pulverization of the Sn layer surface was observed in the electrode a1 of the present invention than in the electrode e1 of the present invention. On the other hand, pulverization of the Sn layer in its entirety was observed in the comparative electrode b. It has been confirmed from these observations that the provision of the hard carbon thin film on a surface of the layer of Sn active material further prevents pulverization of active material and thereby further improves cycle characteristics.

Experiment 6

Using the electrode e1 obtained in the above Experiment 5, a rechargeable lithium battery was constructed in the same manner as in Experiment 3. The battery E1 obtained was subjected to a charge-discharge test in the same manner as in Experiment 3 to determine a cycle efficiency. The results are shown in Table 6. In Table 6, the results for the battery A1 of the present invention as constructed in Experiment 3 and the comparative battery B1 are also shown.

TABLE 6

| Battery | DLC Film Thickness (nm) | Cycle Efficiency (%) |
| --- | --- | --- |
| Battery A1 | 0 | 86 |
| Comp. Battery B1 | 0 | 33 |
| Battery E1 | 200 | 88 |

As can be clearly seen from the results shown in Table 6, the provision of the hard carbon thin film on the layer of Sn active material prevents pulverization of active material and further improves cycle characteristics.

Experiment 7

As analogous to Experiment 1, a 2 μm thick Sn layer was deposited on a rolled copper foil having a surface roughness=0.04 μm or an electrolytic copper foil having a surface roughness=0.60 or 1.19 μm by an electrolytic plating process. After deposition of the Sn layer, each stack was cut into pieces each measuring 2 cm×2 cm in size. One piece was heat-treated at 200° C. for 24 hours, while the other was not subjected to a heat treatment.

Out of the pieces fabricated via deposition of Sn on the rolled copper foil having a surface roughness=0.04 μm, the piece which was subsequently subjected to heat treatment was designated as an electrode f1 and the piece which was not subjected to heat treatment was designated as an electrode f2. Out of the pieces fabricated via deposition of Sn on the electrolytic copper foil having a surface roughness=0.60 μm, the piece which was subsequently subjected to heat treatment was designated as an electrode f3 and the piece which was not subjected to heat treatment was designated as an electrode f4. Out of the pieces fabricated via deposition of Sn on the electrolytic copper foil having a surface roughness=1.19 μm, the piece which was subsequently subjected to heat treatment was designated as an electrode f5 and the piece which was not subjected to heat treatment was designated as an electrode f6.

Each of the above-fabricated electrodes f1–f6 was subjected to cycle characteristics measurement in the same manner as in Experiment 1 to determine a cycle efficiency.

The results are given in Table 7. In Table 7, the results for the electrode a1 and the electrode b1 in Experiment 1 are also shown.

TABLE 7

| Electrode | Surface Roughness Ra (μm) | Heat Treatment | Cycle Efficiency (%) |
| --- | --- | --- | --- |
| f1 | 0.04 | Present | 33 |
| f2 |  | Absent | 1 |
| a1 | 0.188 | Present | 80 |
| b1 |  | Absent | 17 |
| f3 | 0.60 | Present | 82 |
| f4 |  | Absent | 18 |
| f5 | 1.19 | Present | 89 |
| f6 |  | Absent | 20 |

As can be clearly seen from the results shown in Table 7, the electrodes f1, a1, f3 and f5 fabricated by a process that includes heat treatment exhibit improved cycle efficiencies compared to the electrodes f2, b1, f4 and f6 fabricated by a process that excludes heat treatment. Also, when viewed from the surface roughness Ra of the copper foil used, the electrodes a1, f3 and f5 exhibit improved cycle efficiencies relative to the electrode f1. This demonstrates that the preferred surface roughness Ra of the copper foil is 0.1 μm or above.

Figure 18:
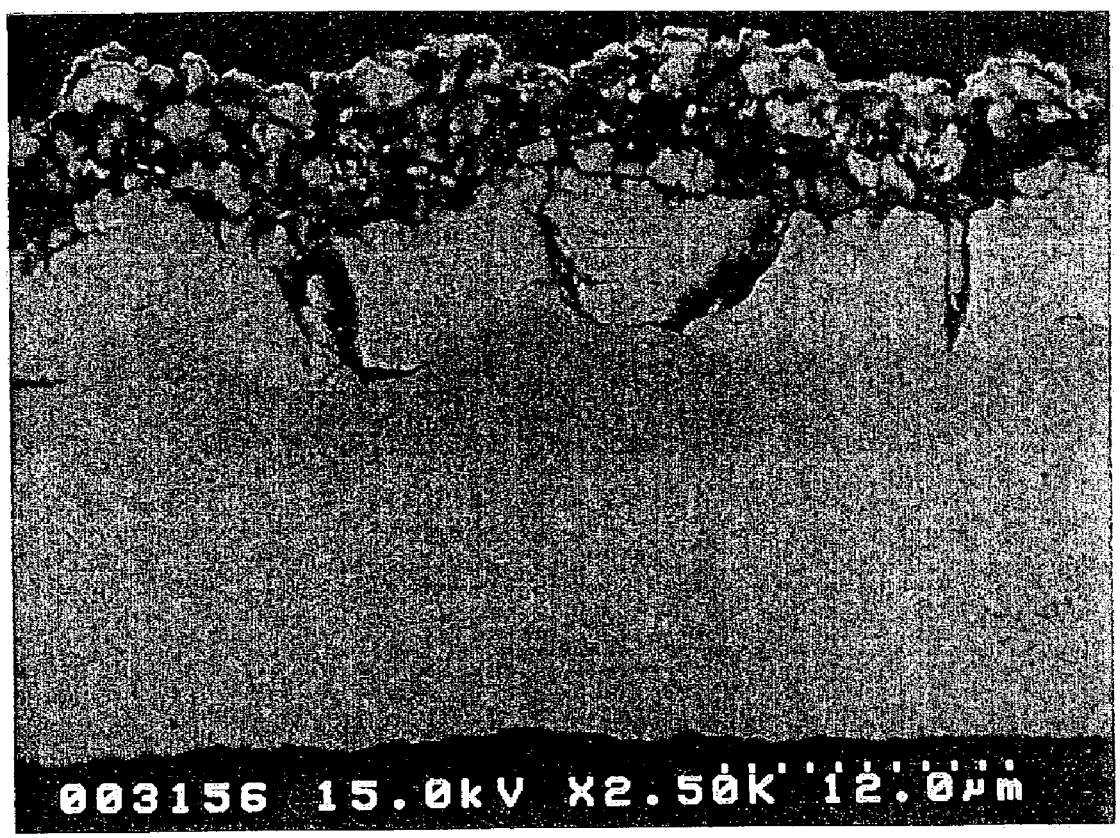
FIG. 18 is a photomicrograph taken using a scanning electron microscope, showing a cross-section of the electrode f5 after charge and discharge (first cycle).

The electrode f5 after the first cycle in the charge-discharge cycle test described above was observed using a scanning electron microscope. FIG. 18 is a photomicrograph taken at a magnification of 2,500× using a scanning electron microscope, showing a cross-section of the electrode f after charge and discharge. Since this electrode includes a current collector having a surface roughness larger than the surface roughness Ra=0.188 μm of the electrode a1 (FIG. 15), it is observed more clearly in FIG. 18 than in FIG. 15 that the layer of active material is divided into islands by gaps formed therein in a manner to extend upwardly in its thickness direction from valleys of irregularities defined on a surface of the current collector.

Experiment 8

A 2 μm thick Sn—Pb or Sn—Zn alloy layer was deposited on an electrolytic copper foil similar in type to that used in Experiment 1 by an electrolytic plating process. In the deposition of the Sn—Pb alloy layer, an Sn—Pb plating bath was used containing a mixture of tin borofluoride, lead borofluoride, fluoroboric acid, boric acid and peptone. In the deposition of the Sn—Zn alloy layer, an Sn—Zn plating bath was used containing a mixture of organotin, organic acid zinc and a complexing agent. As shown in Table 8, the Sn—Pb alloy layers comprising different ratios of Sn and Pb were deposited.

After deposition of each alloy layer, the resulting stack was cut to a 2 cm×2 cm size and subsequently heat-treated at 200° C. for 24 hours. As a result, the electrodes g1–g9 listed in Table 8 were fabricated. Compositions of the alloy layers were determined by ICP emission spectral analysis. In Table 8, the compositions are listed in accordance with a particular form which, in the case of the electrode g1, means to contain 99.5% by weight of Sn and 0.5% by weight of Pb. The varied compositions of the Sn—Pb alloy layers result primarily from the use of the plating baths having varied compositions. In the deposition of the Sn—Pb alloy layers having the compositions 99.5Sn-0.5Pb–82Sn-18Pb (electrodes g1–g5), a 90 wt. % Pb alloy (94 atomic % Sn-6 atomic % Pb alloy) is used as an anode. In the deposition of the Sn—Pb alloy layers having the compositions 78Sn-22Pb–62Sn-38Pb (electrodes g6–g8), a 60 wt. %

Sn-40 wt. % Pb alloy (74 atomic % Sn-26 atomic % Pb alloy) is used as an anode. In the deposition of the Pb—Zn alloy layer having the composition 86Sn-14Zn (electrode g9), an Sn metal is used as an anode. In this case, plating is carried out while providing the plating bath with a fresh supply of Zn (organic acid zinc) that decreases during formation of a deposit film.

As also shown in Table 8, the electrode c1 fabricated in Experiment 2 includes the Sn—Pb alloy layer of 90Sn-10Pb. The Sn—Pb alloy used as an anode in Experiment 2 has the composition of 90 wt. % Sn-10 wt. % Pb.

Using the electrodes g1–g9 and c1, a charge-discharge cycle test was performed to determine their cycle efficiencies. The results are shown in Table 8.

TABLE 8

| Electrode | Composition (WT. %) | Cycle Efficiency (%) |
| --- | --- | --- |
| g1 | 99.5Sn—0.5Pb | 83 |
| g2 | 99Sn—1Pb | 87 |
| g3 | 98Sn—2Pb | 88 |
| g4 | 95Sn—5Pb | 94 |
| g5 | 82Sn—18Pb | 90 |
| g6 | 78Sn—22Pb | 80 |
| g7 | 68Sn—32Pb | 72 |
| g8 | 62Sn—38Pb | 62 |
| g9 | 86Sn—14Zn | 95 |
| c1 | 90Sn—10Pb | 88 |

As apparent from Table 8, the electrodes g1–g9 and c1 fabricated via a sequence of deposition of an Sn—Pb or Sn—Zn alloy layer and subjection to a heat treatment all exhibit satisfactory cycle characteristics. Although Sn, Pb and Zn are metals that alloy with Li, neither Sn and Pb nor Sn and Zn enter into an intermetallic compound with each other.

In the above Examples, the Sn or Sn alloy layer is deposited on the Cu substrate by an electrolytic plating process. However, they may be deposited by an electroless plating process. Other thin film-forming processes, such as sputtering, vapor evaporation and spraying, can also be utilized to deposit the Sn or Sn alloy layer.

UTILITY IN INDUSTRY

In accordance with the present invention, a rechargeable lithium battery can be provided which has a high discharge capacity and exhibits excellent cycle characteristics.

The invention claimed is:

1. An electrode for a rechargeable lithium battery, characterized in that said electrode includes (a) a layer or substrate composed of a metal that does not alloy with Li, (b) a layer or substrate composed of a metal that alloys with Li and (c) a mixed layer interposed between said layer or substrate composed of a metal that does not alloy with Li and said layer or substrate composed of a metal that alloys with Li and composed of these metals, and said mixed layer is divided into islands by gaps formed therein in a manner to extend in its thickness direction and one of (a) and (b) is a substrate having a surface roughness Ra of 0.01–2 μm.

2. The electrode for a rechargeable lithium battery as recited in claim 1, characterized in that said mixed layer has a thickness of 0.5 μm or above.

3. The electrode for a rechargeable lithium battery as recited in claim 1, characterized in that said gaps are formed on or after a first charge-discharge cycle.

4. The electrode for a rechargeable lithium battery as recited in claim 1, characterized in that said mixed layer has irregularities on its surface and said gaps are formed along valleys of said irregularities.

5. The electrode for a rechargeable lithium battery as recited in claim 1, characterized in that said metal that does not alloy with Li is Cu and said metal that alloys with Li is Sn.

6. The electrode for a rechargeable lithium battery as recited in claim 1, characterized in that said layer or substrate composed of a metal that alloys with Li is formed from an alloy of two or more metals that alloy with Li.

7. The electrode for a rechargeable lithium battery as recited in claim 6, characterized in that said alloy contains two or more metals that do not form an intermetallic compound with each other.

8. The electrode for a rechargeable lithium battery as recited in claim 6, characterized in that said metal that does not alloy with Li is Cu and said alloy is an alloy of Sn and Pb.

9. The electrode for a rechargeable lithium battery as recited in claim 6, characterized in that said metal that does not alloy with Li is Cu and said alloy is an alloy of Sn and Zn.

10. The electrode for a rechargeable lithium battery as recited in claim 6, characterized in that one metal in said alloy has a concentration of up to 40 % by weight.

11. The electrode for a rechargeable lithium battery as recited in claim 10, characterized in that said alloy is an alloy of Sn and Pb or an alloy of Sn and Zn and said one metal is Pb or Zn.

12. The electrode for a rechargeable lithium battery as recited in claim 1, characterized in that said mixed layer has a concentration gradient so that a concentration of the metal that alloys with Li increases and a concentration of the metal that does not alloy with Li decreases toward the layer or substrate composed of a metal that alloys with Li.

13. The electrode for a rechargeable lithium battery as recited in claim 1, characterized in that said mixed layer comprises at least two layers having different A:B concentration ratios where A represents the metal that does not alloy with Li and B represents the metal that alloys with Li.

14. The electrode for a rechargeable lithium battery as recited in claim 13, characterized in that said mixed layer comprises a first layer provided on the layer or substrate composed of a metal that does not alloy with Li and having the concentration ratio of A:B=10:1–2:1, and a second layer provided on said first layer and having the concentration ratio of A:B=4:1–1:1.

15. The electrode for a rechargeable lithium battery as recited in claim 1, characterized in that said mixed layer has voids.

16. The electrode for a rechargeable lithium battery as recited in claim 1, characterized in that said mixed layer comprises an intermetallic compound of a metal that does not alloy with Li and a metal that alloys with Li.

17. The electrode for a rechargeable lithium battery as recited in claim 1, characterized in that said mixed layer comprises at least one layer composed of $Cu_6Sn_5$.

18. The electrode for a rechargeable lithium battery as recited in claim 1, characterized in that said mixed layer is formed by a heat treatment that causes diffusion of said metal that does not alloy with Li and/or said metal that alloys with Li.

19. The electrode for a rechargeable lithium battery as recited in claim 18, characterized in that said heat treatment is effected at a temperature of 160–240° C. when the metal that does not alloy with Li is Cu and the metal that alloys with Li is Sn.

20. The electrode for a rechargeable lithium battery as recited in claim 19, characterized in that said beat treatment is effected at a temperature of 180–240° C.

21. The electrode for a rechargeable lithium battery as recited in claim 1, characterized in that a layer or substrate composed of a metal that does not alloy with Li is provided on one surface of the layer or substrate composed of a metal that alloys with Li, and a thin film which does not react with Li ions, permits passage of Li ions and has no ionic conductivity for Li ions is provided on the other surface of the layer or substrate composed of a metal that alloys with Li.

22. The electrode for a rechargeable lithium battery as recited in claim 21, characterized in that said thin film is a hard carbon thin film.

23. The electrode for a rechargeable lithium battery as recited in claim 22, characterized in that said hard carbon thin film shows a Raman scattering spectrum in which a ratio (Id/Ig) of a peak intensity Id around 1,400 cm$^{-1}$ to a peak intensity Ig around 1,550 cm$^{-1}$ is 0.5–3.0.

24. The electrode for a rechargeable lithium battery as recited in claim 21, characterized in that said thin film has a thickness of 50–1,000 nm.

25. The electrode for a rechargeable lithium battery as recited in claim 21, characterized in that said thin film has a volume resistivity of $10^{10}$ Ωcm or below.

26. The electrode for a rechargeable lithium battery as recited in claim 21, characterized in that an interlayer is provided between the layer or substrate composed of a metal that alloys with Li and said thin film.

27. The electrode for a rechargeable lithium battery as recited in claim 26, characterized in that said interlayer is formed from at least one selected from Si, Ti, Zr, Ge, Ru, Mo, W and their oxides, nitrides and carbides.

28. A rechargeable lithium battery including a negative electrode comprised of the electrode as recited in claim 1, a positive electrode and a nonaqueous electrolyte.

29. The electrode for a rechargeable lithium battery as recited in claim 1, characterized in that said substrate has surface roughness Ra of 0.1–2 μm.

30. An electrode for a rechargeable lithium battery, characterized in that said electrode includes a substrate that has a surface roughness Ra of 0.01–2 μm and is composed of a metal that does not alloy with Li, a layer provided on said surface of the substrate and composed of a metal that alloys with Li and a mixed layer interposed between said substrate and said layer and composed of these metals, and said mixed layer is divided into islands by gaps formed therein in a manner to extend in its thickness direction.

31. The electrode for a rechargeable lithium battery as recited in claim 30, characterized in that said substrate has surface roughness Ra of 0.1–2 μm.

32. The electrode for a rechargeable lithium battery as recited in claim 30, characterized in that said substrate composed of a metal that does not alloy with Li is an electrolytic copper foil.

33. The electrode for a rechargeable lithium battery as recited in claim 30, characterized in that said layer composed of a metal that alloys with Li or a metal that does not alloy with Li is provided in the form of a film plated on said substrate.

34. An electrode for a rechargeable lithium battery, characterized in that said electrode includes a substrate that has a surface roughness Ra of 0.01–2 μm and is composed of a metal that alloys with Li, a layer provided on said surface of the substrate and composed of a metal that does not alloy with Li and a mixed layer interposed between said substrate and said layer and composed of these metals, and said mixed layer is divided into islands by gaps formed therein in a manner to extend in its thickness direction.

35. The electrode for a rechargeable lithium battery as recited in claim 34, characterized in that said substrate has surface roughness Ra of 0.1–2 μm.

36. An electrode for a rechargeable lithium battery, characterized in that said electrode includes a substrate that has a surface roughness Ra of 0.01–2 μm and is composed of a metal that does not alloy with Li, a layer provided on said surface of the substrate and composed of a metal that alloys with Li and a mixed layer of said metals formed by allowing said metal that does not alloy with Li to diffuse into said layer from said substrate, and said mixed layer is divided into islands by gaps formed therein in a manner to extend in its thickness direction.

37. The electrode for a rechargeable lithium battery as recited in claim 36, characterized in that said substrate has surface roughness Ra of 0.1–2 μm.

* * * * *